Figure 1:
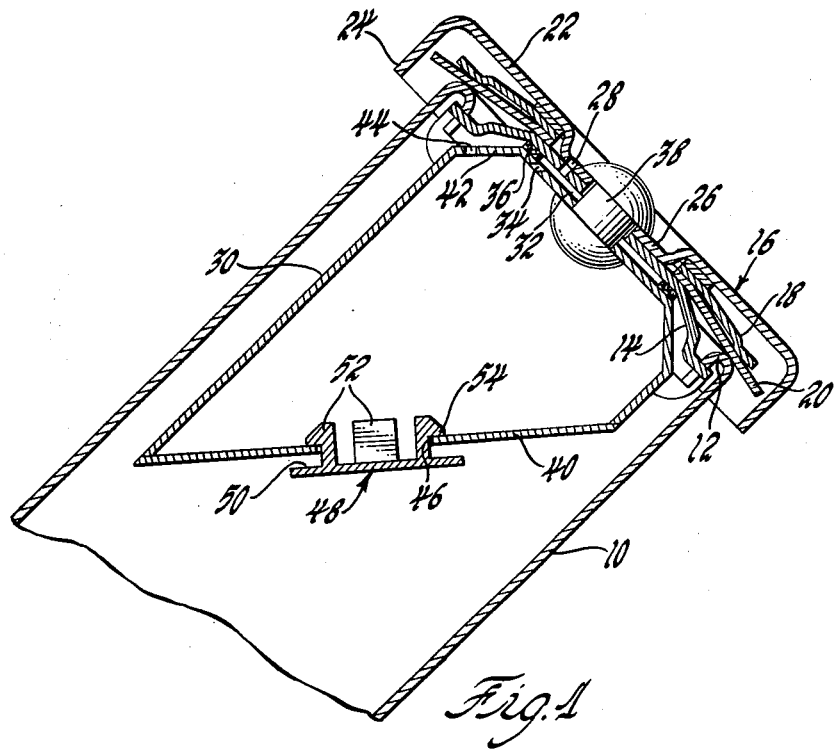

Dec. 11, 1962 R. W. GRAHAM 3,067,908
FUEL TANK FILLER CAPS
Filed Nov. 21, 1960

INVENTOR.
BY Robert W. Graham
George E. Johnson
ATTORNEY

United States Patent Office 3,067,908
Patented Dec. 11, 1962

3,067,908
FUEL TANK FILLER CAPS
Robert W. Graham, Birmingham, Mich., assignor to General Motors Corporation, Detroit, Mich., a corporation of Delaware
Filed Nov. 21, 1960, Ser. No. 70,562
3 Claims. (Cl. 220—44)

This invention relates to tank closures and more particularly to caps for the filler necks or fuel tanks of vehicles.

It is customary to provide vents in fuel tank caps in order not adversely to affect the flow of fuel from the tanks to the engines being served. However, conditions often arise wherein the fuel is caused to flow out and escape to the atmosphere through the vents provided. This occurs when vehicle motion causes the fuel to surge up against the inner side of a vented cap. Not only is there a loss of fuel and a danger of fire but the odor of the escaped fuel may reach and be highly objectionable in a closed car body.

An object of the present invention is to provide an improved fuel tank filler cap which is vented but nevertheless prevents a surge of fuel causing fuel discharge through the vent.

A feature of the present invention is a filler tank cap which closes against a rapid flow of fuel induced by fuel surges but has a reservoir effecting continuous venting.

These and other important features of the invention will now be described in detail in the specification and then pointed out more particularly in the appended claims.

Figure 2:
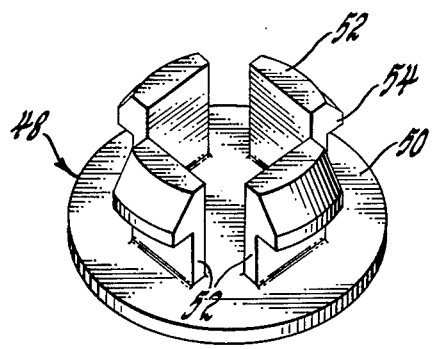

In the drawings:

FIGURE 1 is a sectional view of a filler neck which is part of a fuel tank and a closure or cap which presents one embodiment of the present invention; and FIGURE 2 is a perspective and enlarged view of a plug or valve means used in the cap of FIGURE 1.

An inclined filler neck 10 of a fuel tank as depicted in FIGURE 1 has become quite popular in modern automotive vehicles. It is sometimes used with fuel tanks accessible from the sides of the vehicles. In the latter event, the filler neck extends upwardly toward a side of the vehicle and is, therefore, often subject to fluid pressure developed by surging liquid in the tank as the vehicle concerned is driven around a corner or around a curve. Unless expedients are availed of to prevent the escape of liquid fuel from the necessary vent in the filler cap, the disadvantages, as already set forth, are experienced.

In the present development, the tank opening bears an annular turned-in cam flange 12 which is conventionally notched for the reception of opposed ends of a cross member 14 when the cap generally indicated at 16 is placed in position on the filler neck. A spring disk 18 and a sealing disk 20 are also provided in the cap sealingly to engage the annular edge of the filler pipe when the cap is rotated to its closing position. The cap includes an outer annular cover 22 which bears a skirt 24 encompassing the disks 18 and 20 and clears the outer diameters of the disk 20 and the filler neck 10. An inner central area 26 of the cover 22 is depressed and provided with a main outer vent 28. This vent is continued through the cross member 14 and communicates with the interior of a reservoir 30 by way of an annular space 32 and an inner vent 34. The space 32 between the cross member 14 and the reservoir 30 is determined by a washer 36 and the outer diameter of a rivet 38. The latter holds the cover 22, the cross member 14 and the reservoir 30 as well as the disks 18 and 20 to give a unitary construction to the filler cap.

The attachment of the cap 16 to the tank is such that upon application of the cap to the tank and subsequent turning of the unit to its operative position as shown, a wall 40 of the reservoir is placed in its horizontal position. An upper wall portion 42 of the reservoir 40 is provided with a second inner vent 44. This latter vent communicates with an upper zone portion of the neck 10 or fuel tank.

The wall 40 is provided with a main inner vent 46 and loosely mounted in this vent is a valve or plug 48. The latter has a seat 50 which faces upwardly and toward the underside of the wall 40. The plug 48 is held in the vent by means of four prongs 52 having shoulder portions 54 overhanging the margin of the wall 40 surrounding the main inner vent 46.

The operation of the cap is clear from the above description but it may be stated that a surge of fuel in the tank toward the cap 16 will cause the plug 48 to rise and close the main inner vent 46. It is obvious that the plug 48 could be hollow or of buoyant material so that its buoyancy would aid in effecting closure of the vent 46. Venting from and to the atmosphere will still take place by way of the vents 28, 34 and 44 despite any temporary closure of the main inner vent 46. Any liquid which may enter the reservoir 30 by way of the vent 44 will be trapped in the reservoir and the capacity of the latter is sufficient so that an adequate time interval will transpire before any liquid can be discharged to the atmosphere. After that interval, the liquid level will lower and the valve means or plug 48 will fall into its open position effecting quick draining of the reservoir.

I claim:

1. A fuel tank filler cap comprising a cover adapted sealingly to close the end of a fuel tank filler neck, a main outer vent in said cover, a reservoir fixed to said cover and adapted to fit within said neck, two inner vents in said reservoir with one communicating with said main outer vent and the other being near said cover and thereby adapted to connect with an upper interior zone of said filler neck, a main inner vent in a low wall portion of said reservoir and remote from said cover, and a plug movably retained in said main inner vent and adapted to close the latter when urged upwardly by fuel pressure within said neck.

2. A fuel tank filler cap comprising a cover adapted sealingly to close an opening in a fuel tank, a main outer vent in said cover, a reservoir fixed to said cover communicating with said outer vent and adapted to fit within said tank, a small inner vent in a high wall portion of said reservoir adapted to communicate with an upper interior zone of said tank, a main large inner vent in a low wall portion of said reservoir, and valve means controlling and having a loose fit within said main inner vent and adapted to close the latter when urged by fuel pressure within said tank.

3. A fuel tank filler cap as set forth in claim 2, said valve means comprising a plug with a seat facing the low wall portion of said reservoir and having prongs loosely holding said plug within said main large inner vent, and said small inner vent being adapted to serve as a vent when said main large inner vent is closed.

References Cited in the file of this patent
UNITED STATES PATENTS

| | | |
|---|---|---|
| 1,340,719 | King | May 18, 1920 |
| 1,371,669 | Davis | Mar. 15, 1921 |
| 1,531,273 | Clifford et al. | Mar. 31, 1925 |
| 2,133,200 | Kenneweg | Oct. 11, 1938 |
| 2,164,450 | Eshbaugh et al. | July 4, 1939 |

FOREIGN PATENTS

| | | |
|---|---|---|
| 1,138,578 | France | Jan. 28, 1957 |